United States Patent [19]
Chen

[11] Patent Number: 5,930,346
[45] Date of Patent: Jul. 27, 1999

[54] EXTENDED PUBLIC SWITCHED TELEPHONE NETWORK ARCHITECTURE WITH ENHANCED SUBSCRIBER CONTROL ON CALL SETUP

[76] Inventor: Abraham Y. Chen, 2035 Tripiano Ct., Mountain View, Calif. 94040-3870

[21] Appl. No.: 08/732,937

[22] Filed: Oct. 17, 1996

[51] Int. Cl.[6] .............................. H04M 3/42; H04M 7/00
[52] U.S. Cl. ...................... 379/201; 379/233; 379/230; 379/207
[58] Field of Search ..................... 379/231, 232, 379/233, 230, 202, 212, 106.02, 257, 237, 201, 207, 210, 211

[56] References Cited

U.S. PATENT DOCUMENTS

| | | | |
|---|---|---|---|
| 4,930,153 | 5/1990 | Hagedorn | 379/233 |
| 5,161,181 | 11/1992 | Zwick | 379/201 |
| 5,189,694 | 2/1993 | Garland | 379/106.09 |
| 5,422,941 | 6/1995 | Hasenauer et al. | 379/225 |
| 5,432,845 | 7/1995 | Burd et al. | 379/210 |
| 5,467,390 | 11/1995 | Brankley et al. | 379/229 |
| 5,509,054 | 4/1996 | Garland | 379/106.09 |
| 5,535,267 | 7/1996 | Schull | 379/106 |
| 5,539,817 | 7/1996 | Wilkes | 379/230 |
| 5,592,541 | 1/1997 | Fleischer, III et al. | 379/230 |
| 5,666,401 | 9/1997 | Morganstein et al. | 379/233 |
| 5,673,308 | 9/1997 | Akhavan | 455/461 |
| 5,682,422 | 10/1997 | Oliver | 379/107 |
| 5,692,039 | 11/1997 | Brankley et al. | 379/229 |

*Primary Examiner*—Krista Zele
*Assistant Examiner*—Benny Q. Tieu

[57] ABSTRACT

A telephone call setup technique, based on an expanded originating subscriber dialing procedure, utilizing existing Public Switched Telephone Network (PSTN) facilities, provides a remote control means to directly instruct a customer premise switching module at the end of the terminating subscriber loop, which automatically routes the call to a terminating subscriber's station specified by the originating subscriber. This technique essentially expands the definition of PSTN's automatic switching system boundary to the end of every subscriber loop. Not only individuals on a residential premise can be reached separately, but also the on-demand switched data communications can be routed through PSTN to specific terminals without the concern of disturbing occupants on the premise. The architecture of this system also provides PABX functions to residential single line telephone services. This technique replaces the basic auto-attendant functions on PABX's. Furthermore, with the station addressing procedure (secondary dialing) converged back to the originating central office, subscribers using decadic pulse dialing telephone station instruments, which could not perform end-to-end signalling, can now directly access terminating subscriber's stations, as if they were directly connected to PSTN individually.

8 Claims, 5 Drawing Sheets

EXTENDED PUBLIC SWITCHED TELEPHONE NETWORK ARCHITECTURE WITH ENHANCED SUBSCRIBER CONTROL ON CALL SETUP

BACKGROUND OF THE INVENTION

1. Technical Field

This invention relates to enhancements of public switched telephone network architecture.

2. Description of the Related Art

The Public Switched Telephone Network (PSTN) has a very unique feature that it provides to each and every subscriber a fairly uniform set of capabilities that other forms communication services could not match. For example, every subscriber is identified by an unique telephone number. Without any prior appointment, any subscriber can contact another subscriber at any time by simply dialing the corresponding telephone number from a telephone instrument. This level of flexibility and convenience has made the PSTN the most depended upon form of communication facility in modern life.

The PSTN has evolved, from an initial simple goal of providing voice communication between two individuals over a century ago, to the current state of sophisticated information exchange network among the subscribers. This history of the PSTN being able to successfully keep pace with the evolution of human society is an amazing record.

One significant architectural enhancement to the PSTN was prompted by the expansion of business. When a caller reaches a business nowadays, there are more than one people working there. And, a particular person may be not at the desk but somewhere on the premise. Thus, a localized switching machine privately owned by the business (Private Branch/Business exchange—PBX) is installed at the business location to provide the additional routing capability. Initially, this local switching function was managed by the business' own attendant (one or more full time operators, or as part of a receptionist's duties). With the introduction of voice announcement prompter and Dual Tone Multi-Frequency (DTMF) remote signalling, the Automated PBX (PABX) became available. As far as a caller is concerned, upon hearing the voice prompt from the PABX, the selection of an extension number, commonly referred to as "secondary dialing", is pretty much accepted as the "extra digit(s)" in reaching a person's business telephone. Thus, the PSTN system architecture has been expanded outward to business entities beyond the local end office, traditionally referred to as the Central Office (CO).

Another important aspect of PSTN's evolution is its ability to carry data traffic besides the originally intended voice communication. This was accomplished by utilizing MODEM's (MOdulator & DEModulator) that convert data information from computers into voice band signals for transmission.

Both of these were well accepted in the business environment where calls are greeted by an attendant, either human or mechanized, then directed to the ultimate station instrument based on the caller's selection. And, computers using separate station lines are treated like additional office telephone sets by PABX. Thus, the PSTN, in conjunction with PABX's has been serving voice and data communication needs of the business entities very well.

On the other hand, there have been compromises along the way in many areas. As time goes on, they have built up to begin impeding the PSTN's ability to continue offer its functionalities uniformly to serve the general public towards the future.

As residential subscribers become similarly sophisticated, various types of station instruments, from multiple extension telephone sets, answering devices, facsimile machines, personal computer modems, alarm systems to Home Automation (HA) systems are often used in the same residential setting. Although each of these devices may be used occasionally and the combined traffic can hardly justify an additional telephone line, every device need be constantly connected to the line so that it can perform the designated function when it is called upon. This has worked well on calls originated locally. However, since each station instrument is designed with the assumption that it is the only instrument on the telephone line, this multiple device configuration has resulted in frequent operational confusions on incoming calls and caused irritations to callers.

With more and more home based small business being set up and the vision for a nation wide information superhighway on the horizon, the need for a flexible switched communication network that can serve both voice and data traffic to and from, not only business subscribers but also residential subscribers has become a real issue. If the current PSTN can not satisfy the need, much more expensive new networks have to be deployed. Even if such a technology can be identified, its deployment will take some time to reach the PSTN's current level of "universal connectivity" coverage. This target is much easier said than done, because most of the residential subscribers are very much content with the basic Plain Old Telephone Service (POTS), commonly known as "Dial Tone Service". There will be very little reason for these subscribers to jump onto the new band wagons, no matter how attractive they may be. As a result, the national information superhighway, if it is based on one of the new technologies, will not be accessible by the general public, but restricted to only a selected group of subscribers. Consequently, the population will be divided by whether or not a person has access to the information network (the World Wide Web based on Internet). Such a separation will be detrimental to the unity of the nation in the long run.

A class of telephone line sharing devices, commercially known as FAX switch, has reduced the above problems in some incidences. However, its design goal is to serve telephone lines which are set up primarily for FAX or modem transmissions. Voice call is treated as an exception on its operation priority list. Therefore, when FAX switch is used on primary line or single line service, its behavior is often very offending to a voice caller.

The single line module of Modular Automatic Telephone Switching System (U.S. Pat. No. 5,022,069) provided the line sharing service from voice callers' point of view. With optional FAX and/or modem tone detectors, this unit can also provide automatic routing for data types of calls, which are treated as subordinate to (or operating in the background of) the primary voice call processing.

What was implicit in these last two approaches was these additional routing processes can only be executed after a call is answered by one of these devices. This condition is quite disturbing to callers who are unaware of this extra switching process that is required to reach a desired party. For example, callers from foreign countries may be levied by their telephone companies for a "completed" international call that they did not know how to get through to a person.

This constraint has also limited the PSTN from serving as a switched data network for HA related activities. For example, an utility company would like to access a customer's utility meter, by utilizing the customer's idling telephone line at night for remote reading, without disturbing the residents. Such a setup also has to be able to avoid distracting ordinary voice callers.

A Network Interface Unit (U.S. Pat. No. 5,528,675), disclosed along with a protocol of originating a call to be routed through it, has provided the solution to meet these requirements, without the need of any explicit involvement of the PSTN. Thus, the existing PSTN can provide switched voice and data communications between any two subscribers, without adverse effect to ordinary voice callers.

To achieve these goals without any modifications to the existing PSTN, this latest invention made a conscious performance trade-off. It operates on the principle of blocking the initial two ringing cycles of every call while making the determination of the type of the caller, being an ordinary voice caller or a computer making a data call. This screening process introduces delay in setting up a call, because the called party will not hear the first two rings.

The PABX's (as well as a simpler form of private switching systems, the Key Telephone System—KTS) routinely block the first ringing cycle to minimize false responses to line noises. Also, to fully benefit from the Caller ID service so that the occupants are not disturbed by un-invited callers, incoming call ringing need be blocked until the Caller ID information, which is delivered after the first ringing cycle, is analyzed and matched with the "guest list" in the Caller ID decoder's database. Furthermore, the PSTN's ringing system has a random probability of "missing" one ring or "advance" ringing from the caller's perspective.

Since most calls are made between two parties far apart from each other and without pre-arranged timing, caller usually does not have a definitive prediction of how quickly the called party would hear the ringing and then answer the call anyway. So, the called party's apparent extra delay in response by a couple of ringing cycles can not be sensed by the calling party.

The fact is, ringing signals for any call may be randomly delayed or advanced from the caller's perspective without any adverse effect to the caller. However, explicitly describing to subscribers about the definitive two cycles of ringing delay when U.S. Pat. No. 5,528,675 is practiced, may face some psychological resistance. So, if at all possible, the setup delay of an on-demand data communication system need be cut back to the more commonly accustomed one ringing cycle.

An issue hidden among the above PSTN service enhancements is that the originating subscriber is often required to send command signals to the terminating end to achieve one of these operations. The only reliable signalling method available to the originating subscriber for this purpose is DTMF dialing. Although station instruments with this signalling capability have become very popular in recent years, there are still a huge number of Decadic Pulse (DP) phones in use. Subscribers using DP station sets are increasing get frustrated by their inability to reach stations that can only be accessed through secondary dialing.

It is therefore the object of the present invention to achieve the combined goals of segregating data calls from voice calls, routing voice calls to specific individuals, while reducing the initial ringing cycle delay back to one, and allowing DP instruments to reach specific station on the terminating site. The trade-off in the present approach is that it has to rely upon one of the PSTN capabilities. Although eventually this will be more efficient than the technique disclosed by U.S. Pat. No. 5,528,675, this new system will take some time to begin its usefulness because it depends upon sufficient number of PSTN operating companies to deploy the required enhancement. As it will become clear from the disclosure below, the actual implementation would be simply upgrading the Central Office switching machine's stored programs. There is no hardware facility modification necessary.

SUMMARY OF THE INVENTION

This document discloses a novel technique that allows a PSTN subscriber to originate a call in a manner slightly modified from the conventional dialing method, when enhanced routing service at the terminating end is desired. The extra information in the dialed digit string is transmitted across the PSTN during the call setup and delivered toward the terminating line. A decoding and routing module monitoring the terminating line can then properly route the call to a local station specified by this extra information, without alerting the other station instruments on the same premise. Since this operation is only activated by a knowledgeable caller, un-informed callers, who have dialed only the standard PSTN number will receive the expected basic treatment from the terminating line. The overall ringing delay in this enhanced switching system is limited to one cycle, which is known to be acceptable by the general public from the existing equipment experience. This technique further allows the traditional Decadic Pulse (DP) dialing instruments to be used in reaching terminating subscriber's stations.

In accordance with my invention, since the caller will have the control of the additional routing process at the terminating site, not only the separation of data calls from voice calls can be accomplished, the selection of one out of multiple stations on the same PSTN line can also be easily performed. Essentially, the caller will be able to dial the secondary dialing digits which signify the particular station desired, prior to dialing the normal PSTN number. Such information then controls the operation of an extra stage of automatic switching system located on customer's premise at the end of the subscriber loop. This invention defines a new layer of the automatic switching architecture of the PSTN. In other words, this technique will extend the peripheral boundary of the PSTN. With the PSTN switching architecture extended onto the subscriber's premises, many additional telephone services, which have been confined within the CO's or only available through PABX, will be available with ease as on site services to residential subscribers. For example, the "Distinctive Ringing" service will become obsolete, while the associated auxiliary PSTN numbers can be returned to the national numbering plan pool for re-assignment to new subscribers. Intercom functions within a residence on single line telephone service would work the way it should be, as well.

Telephone equipments are normally connected by two electrical wires. To avoid cluttering the figures, the telephone line connections such as 115, 117, 119, 116, 100 and 104–109 are drawn as single cables with two wires inside. The actual two wires of each cable are partially shown in FIG. 4 to present the detail connections among relays 410, 414–419 and loop_I det 420, 424–429. Symbols "<" and ">" are used to indicate the "fan-out" from cable (line 116) to wires for relays 410 and 414–419 and "recombine" from wires (connecting loop_I det 420 and 424–429) back to cables (line 100 and 104–109), respectively.

Lines 107, 108 for station 137, 138, respectively are similarly set up as lines 100, 104 or 109. Thus, they are not shown in this figure to make room for the necessary details of this module.

Figure 5:
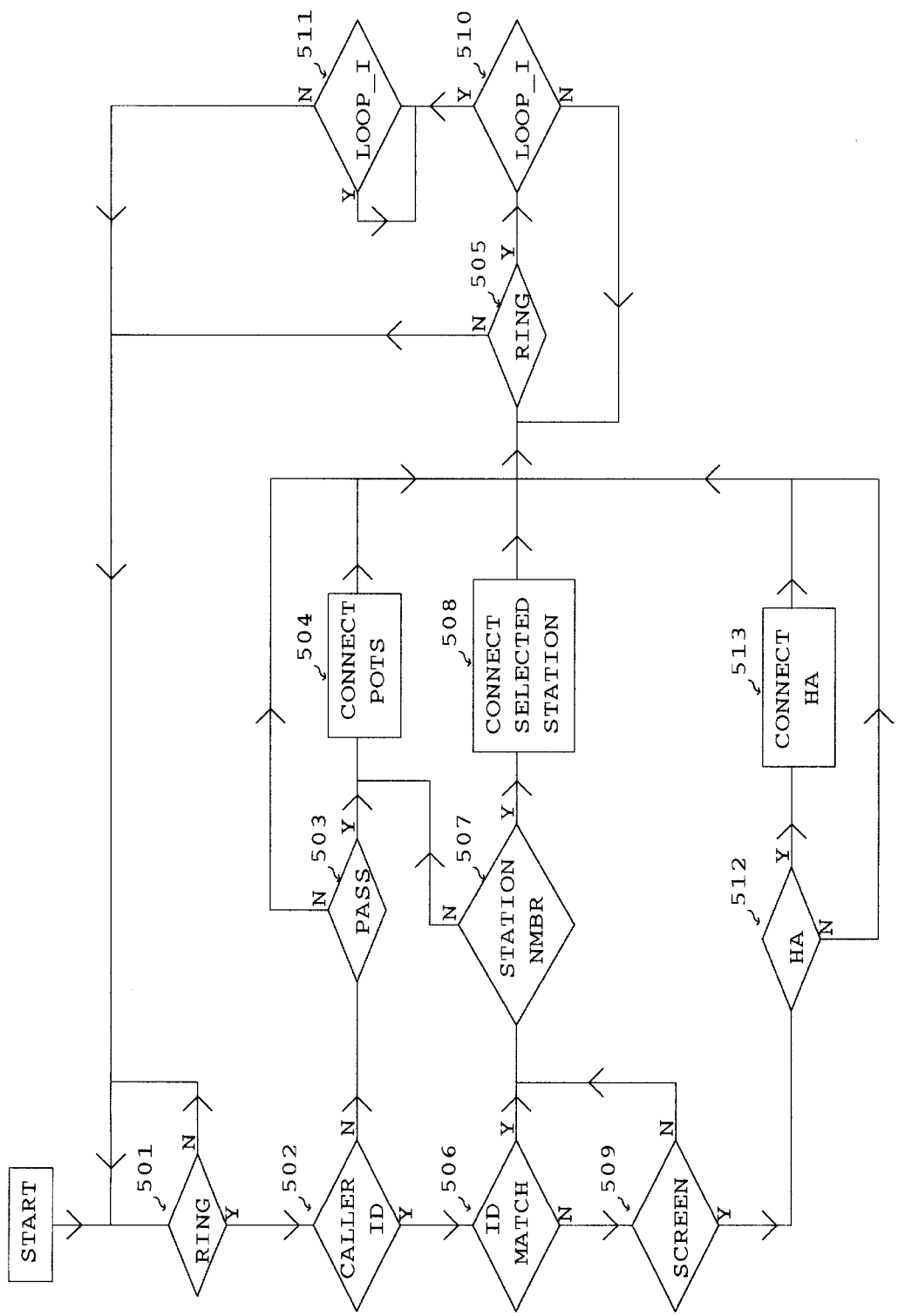

FIG. 5 is an operation flowchart showing how the combinatorial logic 402 might be able to automatically route an incoming call.

DESCRIPTION OF THE PREFERRED EMBODIMENT

Figure 1:
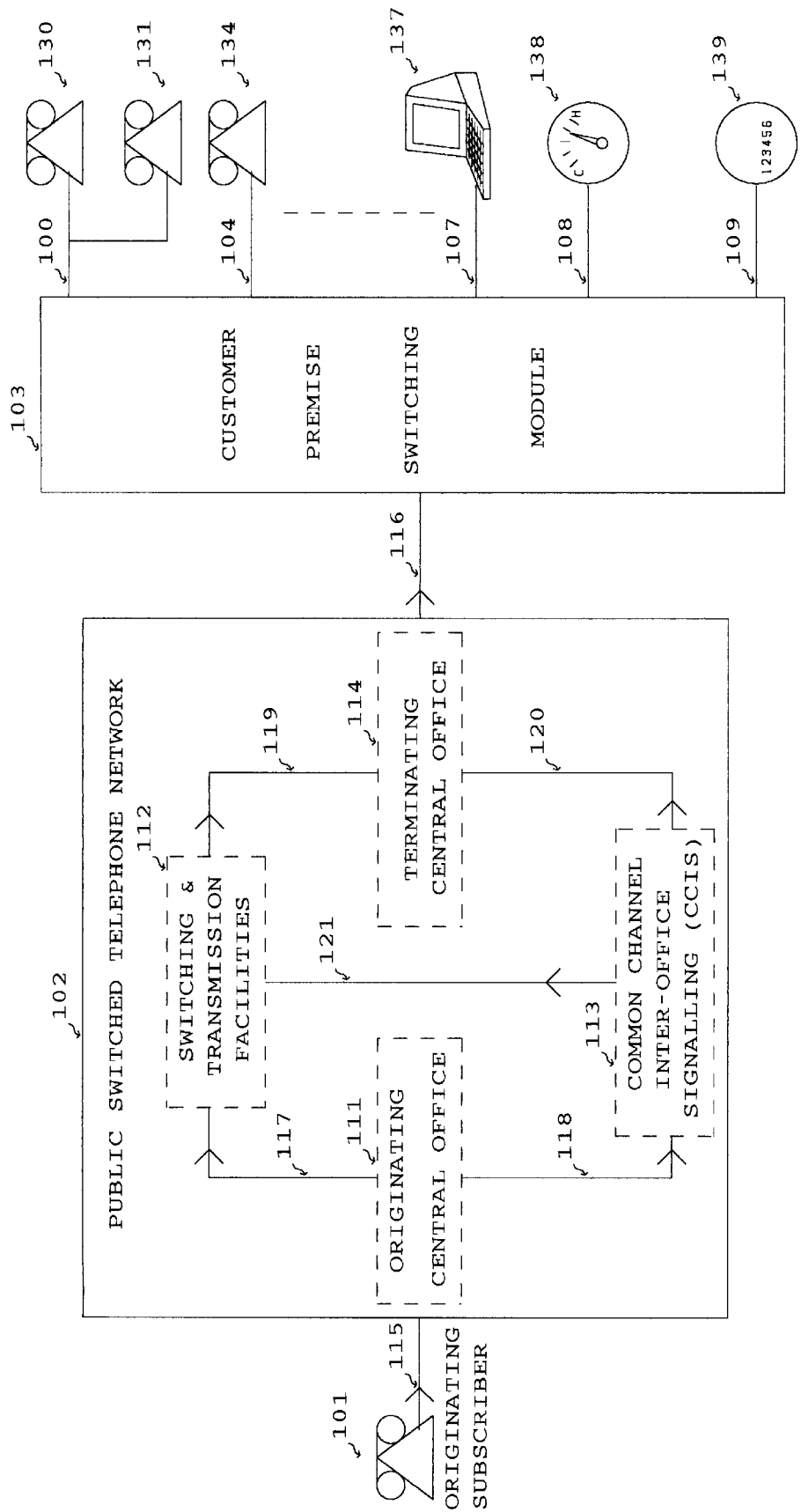
FIG. 1 is the system configuration of my invention, consisting of an originating subscriber represented by a telephone set 101; the Public Switched Telephone Network (PSTN) 102 comprised of originating Central Office (CO) 111, switching and transmission facilities 112, Common Channel Inter-office Signalling (CCIS) 113 equipment, terminating Central Office (CO) 114; the customer premise switching module 103 at the terminating site serving multiple station instruments 130, 131, and 134 which are shown as conventional telephone sets. Station 137 is shown as a computer (with MODEM). A thermostat for station 138 represents Home Automation (HA) equipment interfaced with the telephone line. Station 139 depicts the possibility of accessing an utility meter.

FIG. 1 presents the system layout of the current invention. Besides the customer premise switching module 103 and multiple station instruments 134–139, the remaining components of this figure are equipments used in existing public telephone services. Thus, a brief review of how are they being used would facilitate the understanding of the the present invention:

In the basic telephone operation, commonly referred to as Plain Old Telephone Service (POTS), a call begins with the originating subscriber picks up the receiver of the telephone instrument 101 on line 115 and dials the telephone line number 116 of the terminating subscriber represented by a telephone set 130 (And frequently, there may be additional parallelly connected instruments such as 131. Collectively, these telephone instruments 130 and 131 are referred to as Plain Old Telephone Sets—POTS.). The originating CO 111 communicates this request via data link 118 to CCIS 113 which in turn communicates with the switching & transmission facilities 112 and terminating CO 114 via data links 121 and 120, respectively. If a route through the switching & transmission facilities 112 can be established, the originating CO 111 connects the subscriber line 115 to its originating trunk 117, and the terminating CO 114 connects its terminating trunk 119 to the terminating subscriber line 116 as well as applying ringing signal to alert the terminating subscriber. Station instruments 130 and 131, being directly connected to line 116 via line 100, would receive the ringing signal applied by the terminating CO 114. When one of the station instruments 130 or 131 goes offhook to answer the ringing, conversation with the originating subscriber 101 may take place.

The Caller ID feature, recently introduced by PSTN, enhances POTS by providing the PSTN telephone number of the originating line 115, to the terminating subscriber at 130 or 131. Thus, the later can determine the identity of the originating subscriber before answering the call. This is achieved by utilizing an existing equipment in the originating CO 111, to be detailed in FIG. 2, which automatically identifies the telephone number of the originating line 115. Such information is passed along from the originating CO 111 to terminating CO 114 via data links 118, 120 through CCIS 113. The terminating CO 114 then passes this information by using a Caller ID signal generator, to be detailed in FIG. 3, toward the terminating lines 116 and 100 while applying ringing signals to the same. By incorporating an electronic circuitry that decodes the Caller ID signal, station instrument 130 or 131 can display the identity of the originating subscriber based on the telephone number of the originating line 115.

Once the Caller ID feature is in service, all of the PSTN facilities needed for the present invention are in place.

In order to allow the originating subscriber to specify a station address on the terminating subscriber line, a modified dialing procedure must be provided by the PSTN. Fortunately, the subscribers have been using such procedure for some time already. PSTN has been offering subscribers option services beyond the basic POTS for many years. These include services such as call forwarding, call waiting, 3-way conference call, etc. Some of these services need be activated, deactivated or changed from time to time, or dynamically on per call basis. For example, to prevent call waiting tones from disturbing an important communication, the call waiting service need be deactivated for that session. This requires a procedure that allows the subscriber to send such request to the originating CO 111, prior to the normal dialing of the terminating subscriber's PSTN number. This is accomplished in the following known procedure: Upon hearing dial tone from the originating CO 111 after lifting the receiver offhook, an originating subscriber using telephone instrument 101 dials call waiting deactivation code "*70" (Where "*" is a special key on DTMF dialing keypad whose function can be replaced by dialing "11" on DP dialing phones.). When the dial tone is heard again, the originating subscriber proceeds to dial the terminating subscriber's PSTN number.

The balance of this document details a novel technique that utilizes the above described existing facilities and procedures to accomplish the next phase of the PSTN switching architecture evolution.

As stated above, multiple station instruments on the same telephone line was desirable to fully utilize the connectivity service provided by the PSTN. However, these instruments often interfere one another's operation, besides disturbing the peace of the occupants when certain communication session is only for a particular party, e.g. data equipment. What is needed is a method of treating these station instruments as if they were on separate telephone lines. My invention provides a method of transmitting the originating subscriber's selection of one of the stations on the terminating line 116. This additional information allows the customer premise switching module 103 to automatically route a call without the need of answering the call, prompting the orignating subscriber with voice announcement and then routing the call if a DTMF string is received. Not only knowledgeable originating subscribers can get the call through faster, this system would also maintain the "innocent" operation behavior expected by ordinary originating subscriber who are accustomed to the POTS environment. This process further eliminates the disturbing ringing signals to station instruments which are not designated by the originating subscriber.

Figure 2:
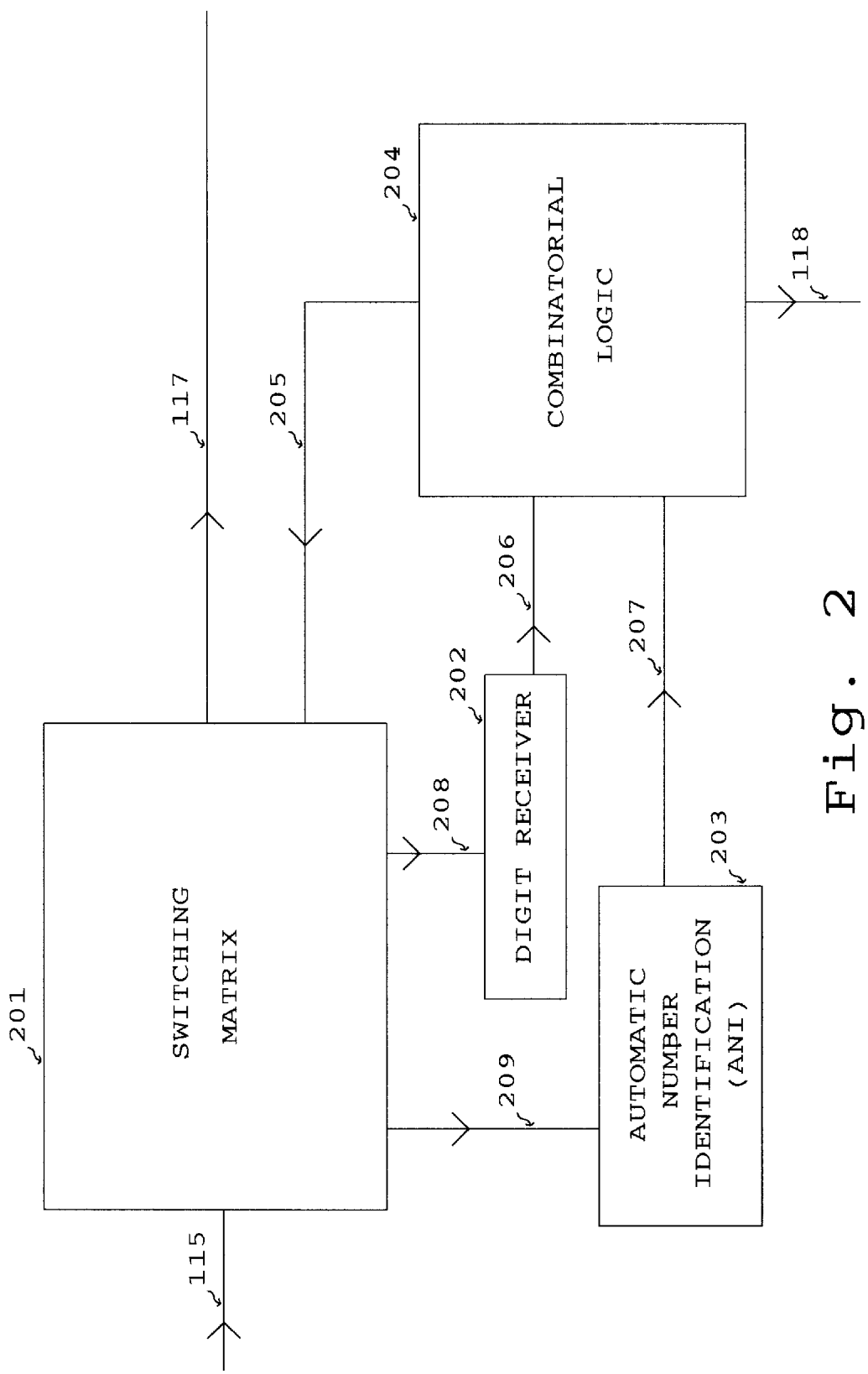
FIG. 2 is a block diagram view of the originating CO 111. Switching matrix 201 provides speech path between the subscriber line 115 to the PSTN access originating trunk 117. It also provides signal access line 208 for the digit receiver 202 at appropriate moments to monitor for the instructions from the originating subscriber 101 in the form of dialed digit string. The originating subscriber is identified by the automatic number identification (ANI) 203 according to the telephone line 115 being used. These information are fed to the combinatorial logic 204, which besides controlling switching matrix 201, also communicates with CCIS 113 via data link 118.

FIG. 2 depicts the functional subsystems in the originating CO 111 that are relevant to the subject matter. A digit receiver 202 decodes the desired terminating subscriber's telephone number that the originating subscriber has dialed, then reports via data link 206 to combinatorial logic 204. In the meantime, the Automatic Number Identification (ANI) 203 equipment forwards the originating subscriber's telephone number 115 determined via its access link 209, to combinatorial logic 204 via data link 207. These information are forwarded to CCIS 113 via data link 118. When CCIS 113 determines that the originating trunk 117 is available to reach the terminating trunk 119, combinatorial logic 204 commands switching matrix 201 via data link 205 to connect originating line 115 to the originating trunk 117.

Figure 3:
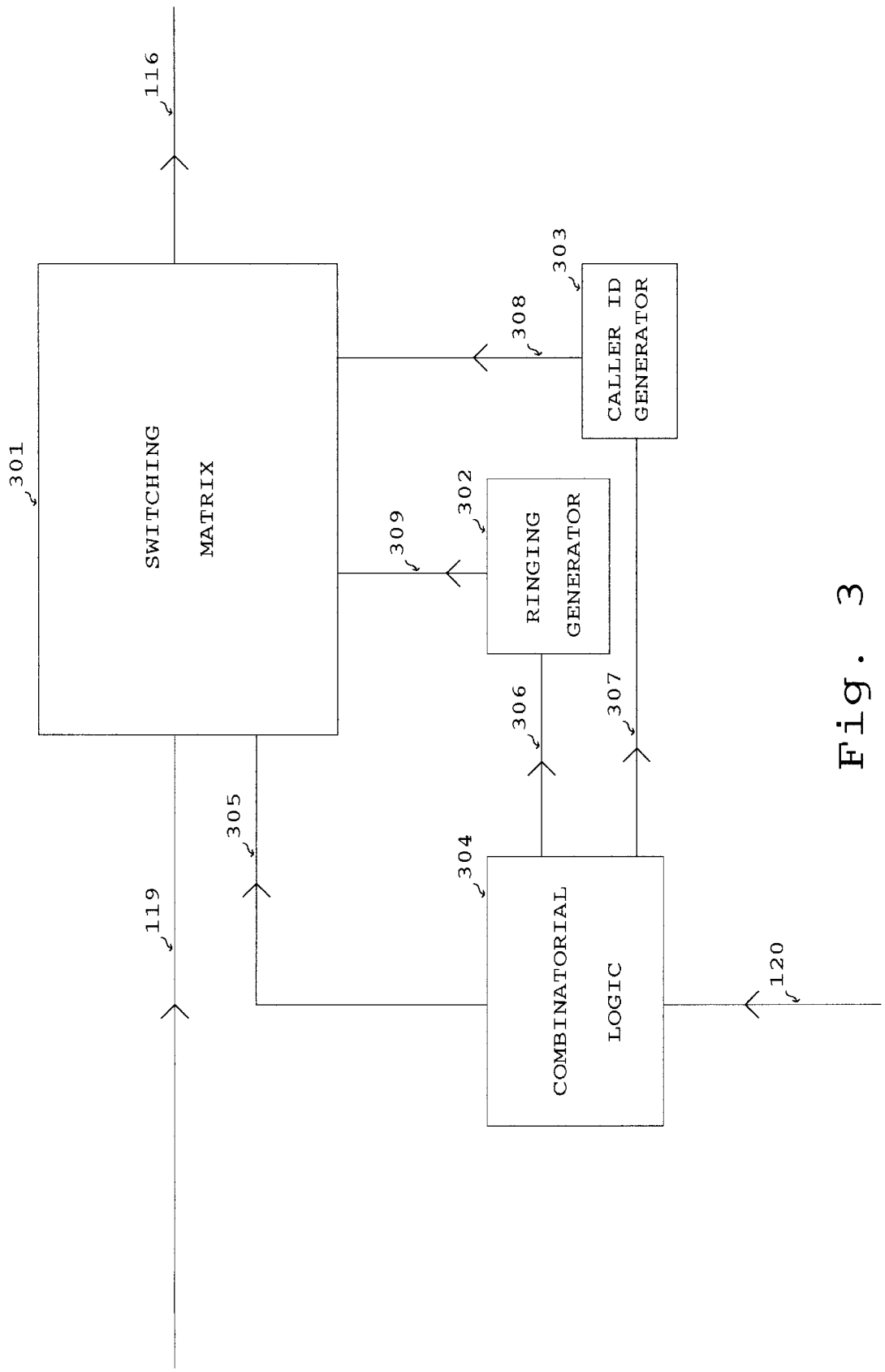
FIG. 3 is a block diagram view of the terminating CO 114. Switching matrix 301 provides speech path between the PSTN access terminating trunk 119 to the terminating subscriber line 116. It also connects ringing generator 302 to subscriber line 116 when the terminating subscriber need be alerted of an incoming call. The Caller ID generator 303 is connected via switching matrix 301 to the subscriber line 116 between the first and second ringing signals from the ringing generator 302. The combinatorial logic 304 controls the operations of 301, 302, 303 via data links 305, 306, 307, respectively with the information supplied from CCIS 113 via data link 120.

FIG. 3 presents functional subsystems at the terminating office that are utilized by the current invention. Based on the terminating subscriber's telephone number in the CCIS 113 message via data link 120, the terminating CO's combinatorial logic 304 commands, via data link 305, the switching matrix 301 to connect the ringing generator 302 to the terminating subscriber line 116 via signal link 309 and turns on the ringing generator 302, via command line 306, to alert the called subscriber. The originating subscriber' telephone number is extracted from the CCIS message by combinatorial logic 304 and transmitted via data link 307 to the Caller ID generator 303. It, in turn, injects signal representing the originating subscriber's telephone number 115, via signal line 308, into switching matrix 301 which provides the proper connection onto the terminating line 116 during the time interval between the first and the second ringing cycles.

Figure 4:
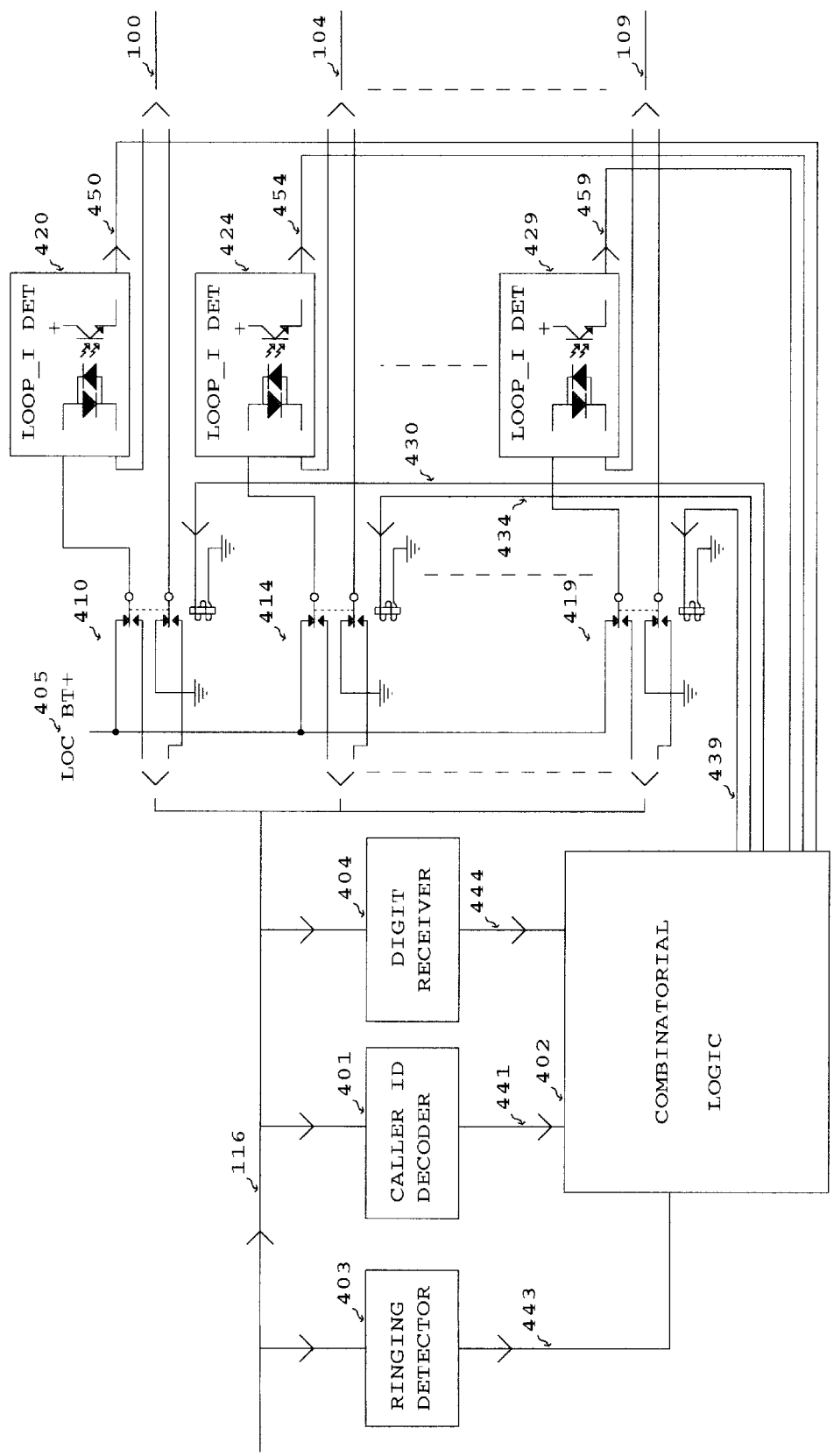
FIG. 4 is a block diagram of the customer premise switching module 103. It consists of ringing detector 403 which monitors line 116 for ringing signal, Caller ID decoder 401 which reports the information received via the Caller ID signal. These information are sent to combinatorial logic 402 via data links 443 and 441, respectively. The loop_I detectors 420 and 424–429 report the status of station lines 100 and 104–109, respectively. The combinatorial logic 402 then controls the activation of the line relays 410 and 414–419 via control lines 430, and 434–439, respectively for appropriate operation modes.

FIG. 4. is a customer premise switching module 103 that performs the automatic routing function based on the information from the Caller ID decoder 401. Normally, it is in a standby state. Ringing detector 403 first alerts combinatorial logic 402, via data link 443, of an incoming call when it senses the ringing signal on line 116. If the Caller ID decoder 401 output 441 indicates station line 109 is specified by the originating subscriber, combinatorial logic 402 energizes relay 419 by applying power to line 439 to connect incoming line 116 to station line 109 such that the subsequent ringing signals from terminating CO 114 are applied to station set 139. When station 139 answers, loop_I detector 429 output 459 would become active. When it becomes inactive later indicating station 139 has gone onhook, combinatorial logic 402 will de-energize relay 419 to restore the customer premise switching module 103 to the standby state.

FIG. 5 is the basic operational logic of the customer premise switching module 103 with particular emphasis on the incoming call routing. As can be seen in FIG. 4, the customer premise switching module is essentially a double-pole-multi-throw switch which connects one terminating subscriber line 116 to multiple station lines 100 and 104–109 depending on the station number specified by the originating subscriber. The customer premise switching module 103 normally is in a standby condition that continuously monitors for incoming ringing (501). Following the detection of ringing, Caller ID message is looked for (502).

If no Caller ID is received, whether the module is in an "all pass" mode is checked (503). If it is affirmative, meaning that the owner of the switching module 103 subscribes to only basic service. Thus, relay 410 is energized (504) to connect line 116 to station line 100. Consequently, the Plain Old Telephone Sets (POTS) 130 and 131 installed around the premise begin to ring. If the switching module 103 is operating in Caller ID screening mode, the call is not allowed to pass (503). No relay is energized. Then, combinatorial logic 402 proceeds to monitor further ringing detector outputs (505).

If Caller ID signal is received, it is compared with a "guest" list preprogrammed by the owner (506). If the ID matches with one of the entries, the station number desired by the originating subscriber is extracted from the Caller ID message (507). The relay for the desired station is energized (508) to receive the subsequent ringing signals on line 116. If no station number can be found in the Caller ID message, POTS 130 and 131 are connected (504).

Even if the originating subscriber is not on the guest list, the operation logic may be in a "no screening" mode (509) whereby station number extraction from the Caller ID message is carried out anyway (507).

When originating line 115 is not on the "guest list" of line 116 and the combinatorial logic 402 is operating with Caller ID screening on, the station number in the Caller ID message is checked against a uniform list of authorized HA service entities (512). If there is a match, the corresponding relay is activated (513). If no match is found, no relay will be energized. Then, the combinatorial logic 402 proceeds to continue monitoring the ringing signals (505).

While ringing continues (505), the combinatorial logic 402 checks for active outputs 450, and 454–459 of the loop_I detectors 420 and 404–429, respectively (510). If no activity is detected when the ringing signal stops (505), the operation logic returns to the original standby state (501).

If the output of a loop_I detector corresponding to an energized relay becomes active (510), answer is confirmed. The operational logic proceeds to monitor for loop_I detector output becoming inactive (511) indicating that the communication session has ended. Then, the system returns to standby state (501).

The following is a step by step explanation of the overall system operation:

Upon hearing dial tone from the originating CO 111 after lifting the receiver offhook, an originating subscriber using telephone set 101 dials a service activation code "*nm l" (Where "n" and "m" are numerical digits "0" through "9". The specific values will be selected among the PSTN operating companies to be in coherence with existing option service codes.). After dial tone is heard again, the originating subscriber dials an extension number of the desired station, for example, 139 and terminates this string with a DTMF "#" (or "12" on decadic pulse phone). After hearing dial tone the third time, proceeds to dial the terminating subscriber's PSTN number.

The originating CO's combinatorial logic 204 sends this information decoded by digit receiver 202, along with the originating line number 115 reported from the ANI 203 to CCIS 113 via data link 118. CCIS 113 then coordinates the connection between originating trunk 117 and terminating trunk 119 through switching & transmission facilities 112 to the terminating CO 114 by contacting them via data links 121 and 120, respectively.

The terminating CO 114, proceeds to alert terminating line 116 accordingly. The originating telephone line number 115 and the desired station number 109 is superimposed onto terminating line 116 between the first and the second ringing signals by caller ID generator 303.

The ringing detector 403 in the customer premise switching module 103 alerts the combinatorial logic 402 about the arriving of the ringing signal by sending data via link 443. The caller ID detector 401 then reports the originating line identity as well as the extension number of the desired station line 109 via data link 441. Combinatorial logic 402, after processing these information in accordance to FIG. 5, energizes relay 419 to let the subsequent ringing signals on the incoming line 116 to be applied to station line 109. If no station number is received and the combinatorial logic 402 is operating under "transparent" mode, relay 410 is activated so that the subsequent ringing signals are applied to the POTS 130 and 131 on station line 100.

If the station number indicates a HA instrument, the connection will be made without verifying whether the originating subscriber's line number is on the "guest list" or not. This operational convention allows the service entities such as utility companies to have uniform access arrangements across the nation.

The output signals 450 and 454–459 from loop_I detectors 420 and 424 through 429, respectively, are monitored by combinatorial logic 402. If no activity is detected and the ringing detector output 443 becomes inactive indicating the originating subscriber has abandoned the call, the combinatorial logic 402 releases all relays 410 and 414 through 419, and returns to a standby mode.

If loop_I det output 459 becomes active indicating station 139 is offhook, answer is assumed. The combinatorial logic 402 then continues to monitor it until it becomes inactive, indicating that the the communication has terminated. Then, the combinatorial logic 402 releases relay 419 and returns to a standby state.

If loop_I det output 424 for station line 104 which is not being rung becomes active indicating someone is attempting to pick up the call, the combinatorial logic 402 will energize the corresponding relay 414 and de-energizes the relay 419, so that station 134 is connected for communication, instead.

When my invention is deployed, many PABX functions become available on single line services. The following is a brief description of some of the features.

Since the combinatorial logic 402 has reserved a fixed set of station numbers for HA related applications such as utility meter reading, HA callers do not need be on the terminating subscriber's "guest list" to get through the customer premise switching module 103. This is very useful to establish an uniform access method for the utilities. However, this does open up a security concern of tempering by un-authorized parties. On the other hand, the solution could be just equally easily implemented: The originating CO 111 should be able to screen out the originating subscribers that are not utilities, by checking the originating line number 115 against a list of pre-authorized originating line numbers that are allowed to specify station numbers representing HA applications.

If the output of a loop_I detector un-related to the energized relay becomes active, attempt by one station to pick up the call is indicated. Under this condition, the combinatorial logic 402 could make decisions on whether this is allowed. For example, since interrupted data communication sessions can be easily re-attempted, while station assigned to humans may have an urgent need to use the telephone service, lines serving voice type stations should have higher priority than those serving, for example, HA applications. A priority list could be provided as default in the combinatorial logic 402, or programmable according to the owner's preference.

With customer premise switching module 103, the basic set of PABX functions, such as Call on-hold, call-transfer, conference call, intercom, etc. can now be realized on single line residential services. To facilitate this, a digit receiver 404 is included in FIG. 4 to monitor the subscriber line 116. It reports to combinatorial logic 402 via data link 444. For example, upon detecting option intercom service activation code and destination code of a desired station 100 from station 134, combinatorial logic 402 puts the originally offhook station line 104 on LOC BT+ 405 by de-energizing relay 414. Simultaneously, central office 114 would apply ringing signal to line 116 with Caller ID message indicating the destination station line 100. Based on Caller ID decoder 401 output 441, combinatorial logic 402 then energizes relay 410 to allow the ringing signal to reach station 130. When it answers, as signified by loop_I detector 420 output 450 becoming active, combinatorial logic 402 then releases relay 414 to allow station 134 to be re-connected. Conversation between stations 134 and 130 can begin. Since this session is managed by the terminating CO 114, it is fully aware of the activities on line 116. Thus, there will be no distractions such as dial tone or time-out warning messages. These conditions would happen if POTS subscriber attempts to pick up the receivers of instruments 130 and 131 to converse to each other in the traditional parallelly wired POTS configuration.

My technique not only works with single line residential service setups, it can also be utilized by PABX and KTS in multi-line business services. By adding the enhanced Caller ID decoders 401 to these systems, the auto-attendant process of answering an incoming call, prompting the originating subscriber with a voice announcement, then routing the call according to the originating subscriber dialed selection digit, can all be replaced.

Another advantage of my invention is the entire routing information, that is, the basic PSTN number and the station number are now completely specified to the originating office while the originating subscriber is initiating a call. The need for end-to-end signalling capability in establishing a call to a station of an ever sophisticated terminating subscriber is drastically reduced. One important benefit of this is that originating subscribers who use DP dialing phones which could not sent the digit representing pulses through the PSTN, will now be able to access a remote station, by simply dialing the station number prior to the standard PSTN number.

This invention has been described with particular attention to its preferred embodiment. It should be understood that variations and modifications within the spirit and scope of the invention may occur to those skilled in the art to which the invention pertains.

What is claimed is:

1. An extended public switched telephone network providing an originating subscriber an enhanced dialing procedure to directly access a specifically selected station among plurality of stations of a terminating subscriber, comprising, originating station instrument with, means to signal via dialed digits on an originating subscriber line, said selected station's address and said terminating subscriber's identity, originating central office with, means to detect and to transmit information signals on originating subscriber's identity, means to detect and to transmit information signals on said dialed digits of said selected station's address and said terminating subscriber's identity, terminating central office with, means to apply alert signals to terminating subscriber line based on said terminating subscriber's identity, means to deliver information signals representing said originating subscriber's identity, and said selected station's address, network facilities with, means to transmit said information signals representing said originating subscriber's identity, said terminating subscriber's identity, and said selected station's address, means to establish speech path between said originating central office and said terminating central office, customer premise switching module with, means to detect said alert signals, means to decode, analyze and screen said information signals representing said originating subscriber's identity and said selected station's address, means to control plurality of stations, means to route said alert signals to said selected station among said plurality of stations, means to establish speech path between said selected station and said terminating subscriber line, said originating central office further comprises, means to establish speech path between said originating subscriber line and said network facilities, said terminating central office further comprises, means to establish speech path between said network facilities and said terminating subscriber line, wherein said network sets up a telephone connection on single line services from said originating subscriber, via said originating station instrument, said originating central office, said network facilities and said terminating central office through said customer premise switching module to said selected station specified by said originating subscriber, without any further action of said originating subscriber subsequent to initial phase of dialing said selected station's address and said terminating subscriber's identity.

2. An extended public switched telephone network in accordance with claim 1, operates with no extra setup delay as compared to existing procedures through said network.

3. An extended public switched telephone network in accordance with claim 1, said originating central office further comprises local authorized utility company list among said originating subscriber lines, said customer premise switching module further comprises uniform list of said selected stations among said plurality of stations for each said utility companies, wherein said network provides utility companies uniform service access to home automation applications with security protection on said telephone connection with screening process performed by said originating central office in accordance to said local authorized utility company list and, routing to said selected stations by said customer premises switching module in accordance to said uniform list of said selected stations for each said utility companies.

4. An extended public switched telephone network in accordance with claim 1, said terminating central office further comprises operation logic which activates functions consisting of said alerting signals and said selected station's address signals upon receiving service activation code and destination code from one of said plurality of stations during conversation, said customer premise switching module further comprises means to monitor during conversation, said service activation code dialed from one of said plurality of stations, and, said alerting signals and said selected station's address signals from said terminating central office, wherein said network provides PABX functions on said telephone connection such as call on-hold, call transfer, conference call, intercom, etc. to said plurality of stations on single line telephone service by said customer premise switching module in response to said service activation code, said alerting signals and said selected station's address signals.

5. A customer premise switching module in accordance with claim 4, performing said PABX functions to said plurality of stations by utilizing said service activation code from one of said plurality of stations, said alert signals and said selected station's address signals from said terminating central office, becomes part of extended architecture of said PSTN.

6. An extended public switched telephone network providing an originating subscriber an enhanced dialing procedure to directly access a specifically selected station among plurality of stations of a terminating subscriber, comprising, originating station instrument with, means to signal via dialed digits on an originating subscriber line, said selected station's address and said terminating subscriber's identity, originating central office with, means to detect and to transmit information signals on originating subscriber's identity, means to detect and to transmit information signals on said dialed digits of said selected station's address and said terminating subscriber's identity, terminating central office with, means to apply alert signals to terminating subscriber line based on said terminating subscriber's identity, means to deliver information signals representing said originating subscriber's identity, and said selected station's address, network facilities with, means to transmit said information signals representing said originating subscriber's identity, said terminating subscriber's identity, and said selected station's address, means to establish speech connection between said originating central office and said terminating central office, PABX (Private Automatic Branch eXchange) with,
  means to detect said alert signals,
  means to decode, analyze and screen said information signals representing said originating subscriber's identity and said selected station's address,
  means to control plurality of stations,
  means to route said alert signals to said selected station among said plurality of stations,
  means to establish speech path between said selected station and said terminating subscriber line,
said originating central office further comprises,
  means to establish speech path between said originating subscriber line to said network facilities,
said terminating central office further comprises,
  means to establish speech path between said network facilities and said terminating subscriber line,
wherein said network sets up a telephone connection from said originating subscriber, via said originating station instrument, said originating central office, said network facilities and said terminating central office through said PABX to said selected station specified by said originating subscriber, without any further action of said originating subscriber subsequent to initial phase of dialing said station's address and said terminating subscriber's identity.

7. An extended public switched telephone network in accordance with claim 1 or 6, provides a method for decadic pulse dialing telephone sets of said originating station to selectively access any one of the said plurality of stations.

8. An extended public switched telephone network in accordance with claim 1 or 6, operates with a call setup dialing procedure that is in total transparency to ordinary said originating subscriber.

* * * * *